(12) United States Patent
Smith et al.

(10) Patent No.: US 11,095,680 B2
(45) Date of Patent: *Aug. 17, 2021

(54) NETWORK TRAFFIC DATA SCRUBBING WITH SERVICES OFFERED VIA ANYCASTED ADDRESSES

(71) Applicant: CenturyLink Intellectual Property LLC, Denver, CO (US)

(72) Inventors: Donald J. Smith, Denver, CO (US); Michael Glenn, Golden, CO (US); John A. Schiel, Littleton, CO (US); Christopher L. Garner, Thornton, CO (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 520 days.

This patent is subject to a terminal disclaimer.

(21) Appl. No.: 15/135,239

(22) Filed: Apr. 21, 2016

(65) Prior Publication Data
US 2016/0241590 A1   Aug. 18, 2016

Related U.S. Application Data

(63) Continuation of application No. 14/209,682, filed on Mar. 13, 2014, now Pat. No. 9,350,706.
(Continued)

(51) Int. Cl.
*H04L 29/06* (2006.01)
*H04L 29/08* (2006.01)
(Continued)

(52) U.S. Cl.
CPC ........ *H04L 63/1458* (2013.01); *H04L 47/125* (2013.01); *H04L 47/801* (2013.01);
(Continued)

(58) Field of Classification Search
CPC .............. H04L 63/1458; H04L 47/125; H04L 47/1801; H04L 63/029; H04L 63/10;
(Continued)

(56) References Cited

U.S. PATENT DOCUMENTS 6,856,991 B1   2/2005   Srivastava
7,047,315 B1   5/2006   Srivastava
(Continued)

FOREIGN PATENT DOCUMENTS

CN   101924764 A  *  8/2010   ............. G06F 12/14
CN   101924764       12/2010

OTHER PUBLICATIONS

Cisco Systems: Whitepaper: "Cisco DDOS Protection Solution-Delivering Clean Pipes Capabilities for Service Providers and Their Customers," Jun. 2005, pp. 1-16.*
(Continued)

*Primary Examiner* — Luu T Pham
*Assistant Examiner* — James J Wilcox

(57) ABSTRACT

Novel tools and techniques for filtering network traffic in an anycasting environment includes receiving network traffic addressed to a plurality of anycasted servers at an edge router, the plurality of anycasted servers comprising one or more anycasted servers. The network traffic is received from the edge server at least one data scrubbing appliance. The at least one data scrubbing appliance filters out undesirable traffic from the network traffic. The at least one data scrubbing appliance "on-ramps" the filtered network traffic to the plurality of anycasted servers. The filtered network traffic is transmitted to the plurality of anycasted servers in a load balanced manner.

20 Claims, 5 Drawing Sheets

Related U.S. Application Data

(60) Provisional application No. 61/799,394, filed on Mar. 15, 2013.

(51) Int. Cl.
*H04L 12/803* (2013.01)
*H04L 12/927* (2013.01)

(52) U.S. Cl.
CPC ........ *H04L 63/029* (2013.01); *H04L 63/0227* (2013.01); *H04L 63/0245* (2013.01); *H04L 63/10* (2013.01); *H04L 63/1441* (2013.01); *H04L 67/1002* (2013.01)

(58) Field of Classification Search
CPC ............... H04L 67/1002; H04L 47/801; H04L 63/1441; H04L 63/0245
See application file for complete search history.

(56) References Cited

U.S. PATENT DOCUMENTS

| | | | |
|---|---|---|---|
| 7,088,718 B1 | 8/2006 | Srivastava | |
| 7,409,712 B1 | 8/2008 | Brooks | |
| 7,512,702 B1 | 3/2009 | Srivastava | |
| 7,665,135 B1 | 2/2010 | Mohiuddin | |
| 7,694,338 B1 | 4/2010 | Jafari | |
| 7,719,958 B1* | 5/2010 | Azimi | H04L 45/28 370/220 |
| 7,797,426 B1 | 9/2010 | Lyon | |
| 8,230,504 B1 | 7/2012 | Jafari | |
| 8,762,535 B2 | 6/2014 | Lyon | |
| 8,966,033 B2* | 2/2015 | Van der Merwe | H04L 61/1511 709/223 |
| 9,300,581 B1* | 3/2016 | Hui | H04L 61/2015 |
| 9,350,706 B1* | 5/2016 | Smith | H04L 63/10 |
| 9,385,925 B1* | 7/2016 | Scholl | H04L 12/18 |
| 10,742,593 B1* | 8/2020 | Vasquez | H04L 67/1097 |
| 2003/0093691 A1* | 5/2003 | Simon | H04L 63/20 726/4 |
| 2006/0153204 A1 | 7/2006 | Wang | |
| 2006/0185014 A1* | 8/2006 | Spatscheck | H04L 63/1458 726/23 |
| 2006/0193252 A1 | 8/2006 | Naseh | |
| 2006/0230444 A1 | 10/2006 | Iloglu | |
| 2006/0233154 A1 | 10/2006 | Eckert | |
| 2007/0198629 A1 | 8/2007 | Ganguly | |
| 2008/0080513 A1 | 4/2008 | Kang | |
| 2009/0067427 A1* | 3/2009 | Rezaki | H04L 45/00 370/392 |
| 2009/0113057 A1 | 4/2009 | Van der Merwe | |
| 2009/0164661 A1* | 6/2009 | Kim | H04L 67/1002 709/238 |
| 2010/0098072 A1* | 4/2010 | Satterlee | H04L 67/1002 370/389 |
| 2010/0121945 A1* | 5/2010 | Gerber | H04L 67/1002 709/223 |
| 2010/0128918 A1* | 5/2010 | MacWan | H04N 21/2402 382/100 |
| 2010/0146038 A1* | 6/2010 | Hajiaghayi | H04L 67/288 709/203 |
| 2010/0153802 A1* | 6/2010 | Van der Merwe | H04L 67/101 714/748 |
| 2010/0251329 A1 | 9/2010 | Wei | |
| 2011/0029596 A1* | 2/2011 | Spatscheck | H04L 67/2842 709/203 |
| 2011/0040861 A1* | 2/2011 | Van der Merwe | H04L 29/08729 709/223 |
| 2011/0047252 A1* | 2/2011 | Kwapniewski | H04L 61/1511 709/220 |
| 2011/0055316 A1* | 3/2011 | Van der Merwe | H04L 29/08729 709/203 |
| 2011/0072127 A1* | 3/2011 | Gerber | H04L 67/2852 709/224 |
| 2011/0134769 A1* | 6/2011 | Lee | H04L 45/125 370/252 |
| 2011/0153719 A1* | 6/2011 | Santoro | H04L 43/08 709/203 |
| 2011/0153864 A1* | 6/2011 | Prasad | H04L 61/2007 709/242 |
| 2011/0153941 A1* | 6/2011 | Spatscheck | H04L 67/1031 711/119 |
| 2011/0196941 A1* | 8/2011 | Macwan | H04N 21/2408 709/217 |
| 2011/0231475 A1* | 9/2011 | Van der Merwe | H04L 67/1002 709/203 |
| 2012/0117649 A1 | 5/2012 | Holloway | |
| 2012/0173696 A1* | 7/2012 | Prasad | H04L 67/16 709/223 |
| 2012/0198549 A1* | 8/2012 | Antonakakis | H04L 61/1511 726/22 |
| 2012/0317235 A1* | 12/2012 | Nguyen | H04N 21/84 709/219 |
| 2013/0013786 A1* | 1/2013 | Kwapniewski | H04L 61/1511 709/226 |
| 2013/0042021 A1* | 2/2013 | Hajiaghayi | H04L 67/2842 709/241 |
| 2013/0044758 A1* | 2/2013 | Nguyen | H04L 45/306 370/401 |
| 2013/0086263 A1* | 4/2013 | Prasad | H04L 67/2842 709/224 |
| 2013/0262697 A1* | 10/2013 | Karasaridis | H04L 67/2842 709/242 |
| 2013/0318195 A1* | 11/2013 | Kwapniewski | H04L 29/12066 709/213 |
| 2014/0040359 A1* | 2/2014 | Spatscheck | H04L 67/2842 709/203 |
| 2014/0047109 A1* | 2/2014 | Santoro | H04L 67/1008 709/224 |
| 2014/0089522 A1* | 3/2014 | Hajiaghayi | H04L 67/2842 709/241 |
| 2014/0156740 A1* | 6/2014 | Prasad | H04L 67/16 709/203 |
| 2014/0157414 A1* | 6/2014 | Antonakakis | H04L 63/1483 726/23 |
| 2014/0245421 A1* | 8/2014 | Lyon | H04L 61/2539 726/11 |
| 2015/0026251 A1* | 1/2015 | Van der Merwe | H04L 61/6059 709/203 |
| 2015/0263935 A1 | 9/2015 | Burbridge | |
| 2015/0288652 A1* | 10/2015 | Prasad | H04L 67/2842 709/245 |
| 2015/0296053 A1* | 10/2015 | Spatscheck | H04L 67/2842 709/203 |
| 2015/0326589 A1 | 11/2015 | Smith | |
| 2016/0028600 A1* | 1/2016 | Santoro | H04L 61/2007 709/224 |
| 2016/0028797 A1* | 1/2016 | Van der Merwe | H04L 29/12066 709/224 |
| 2016/0164997 A1* | 6/2016 | Karasaridis | H04L 43/16 709/213 |
| 2016/0241590 A1* | 8/2016 | Smith | H04L 47/125 |
| 2016/0294985 A1* | 10/2016 | Spatscheck | H04L 67/1002 |
| 2016/0359800 A1* | 12/2016 | Gerber | H04L 67/2842 |
| 2016/0381169 A1* | 12/2016 | Van der Merwe | H04L 67/1002 709/217 |
| 2017/0237767 A1* | 8/2017 | George | H04L 63/1458 726/23 |
| 2017/0257294 A1* | 9/2017 | Santoro | H04L 67/1008 |
| 2017/0310744 A1* | 10/2017 | Maslak | H04L 67/327 |
| 2017/0318127 A1* | 11/2017 | Spatscheck | H04L 67/1002 |
| 2017/0366577 A1* | 12/2017 | Shapira | H04L 63/0236 |
| 2018/0034902 A1* | 2/2018 | Van der Merwe | H04L 29/12066 |

(56) References Cited

U.S. PATENT DOCUMENTS

| | | | | |
|---|---|---|---|---|
| 2018/0048525 A1* | 2/2018 | Karasaridis | ............. | H04L 45/70 |
| 2018/0176248 A1* | 6/2018 | Nikravesh | ............ | H04L 63/1466 |
| 2018/0331925 A1* | 11/2018 | Santoro | ............... | H04L 61/1511 |
| 2018/0332144 A1* | 11/2018 | Spatscheck | ......... | H04L 67/1002 |
| 2019/0132281 A1* | 5/2019 | Sawyer | ................. | H04L 47/122 |
| 2019/0173835 A1* | 6/2019 | Gerber | ................ | H04L 61/2007 |
| 2020/0021483 A1* | 1/2020 | Boutros | ............. | H04L 41/0668 |
| 2020/0036778 A1* | 1/2020 | Flavel | ................. | H04L 67/1008 |
| 2020/0036781 A1* | 1/2020 | Maslak | ................. | H04L 67/327 |
| 2020/0287866 A1* | 9/2020 | Gerber | ................ | H04L 61/2007 |
| 2020/0366638 A1* | 11/2020 | Vasquez | ............. | H04L 61/2007 |
| 2020/0404050 A1* | 12/2020 | Maslak | ................. | H04L 67/1008 |
| 2021/0051044 A1* | 2/2021 | Wondra | ................. | H04L 45/64 |

OTHER PUBLICATIONS

Woodcock, "Best Practices in IPv4 Anycast Routing" Version 0.9, Packet Clearing House, Aug. 2002, pp. 1-42.*

Jin, Machine Translation of Chinese Patent Publication No. CN101924764 A.*

Corelan Team, "Juniper ScreenOS: Default Route Manipulations and Redistributions," Mar. 3, 2011, pp. 1-14.*

Louwersheimer, "Implementing Anycast in IPv4 Networks, International Network Services," INS Whitepaper, Jun. 2004, pp. 1-13.*

Microsoft, "What is Unicast IPv4 Routing?", May 3, 2011, pp. 1-5.*

Walkowiak "Anycasting in Connection-Oriented Computer Networks: Models, Algorithms and Results," Int. J. Appl. Math, Comput. Sci. 2010, vol. 20, No. 1, pp. 207-220, DOI: 10.2478/v10006-01000015-5 (Year: 2010).*

Louwersheimer, "Implementing Anycast in IPv4 Networks, International Network Service," INS Whitepaper, Jun. 2004, pp. 1-13.

U.S. Appl. No. 14/209,682; Final Rejection dated Sep. 11, 2015; 43 pages.

U.S. Appl. No. 14/209,682; Issue Notification dated May 4, 2016; 1 page.

U.S. Appl. No. 14/209,682; Non-Final Rejection dated Apr. 17, 2015; 75 pages.

U.S. Appl. No. 14/209,682; Notice of Allowance dated Jan. 22, 2016; 49 pages.

* cited by examiner

NETWORK TRAFFIC DATA SCRUBBING WITH SERVICES OFFERED VIA ANYCASTED ADDRESSES

CROSS-REFERENCES TO RELATED APPLICATIONS

This application is a continuation application of U.S. patent application Ser. No. 14/209,682 (now U.S. Pat. No. 9,350,706), filed on Mar. 13, 2014, by Donald J. Smith et al., entitled, "Network Traffic Data Scrubbing With Services Offered via Anycasted Addresses," which claims priority to U.S. Provisional Patent Application Ser. No. 61/799,394 (the "'394 application"), filed Mar. 15, 2013 by Donald J. Smith et al., entitled, "Network Traffic Data Scrubbing with Multiple Anycasted Addresses," the entire disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to Internet Protocol ("IP") networking, and more particularly, to techniques for implementing data scrubbing in an anycasted environment.

BACKGROUND

Distributed denial of service ("DDOS" or "DDoS") attacks present security and availability issues for many organizations, and in particular for enterprises engaged in content delivery services. In a DDOS attack, many distributed hosts (usually personal computers infected with malware) flood a targeted system with traffic, such as HTTP requests directed at a web server under attack. When such a server is overloaded with connections, new connections can no longer be accepted, and the server effectively is unavailable. Such attacks, and the resulting unavailability, can produce several adverse consequences for the operator of the server, including loss of reputation, potential loss of business or revenue, and substantial bandwidth costs.

One technique for mitigating DDOS attacks on networks attached to the Internet by passing network traffic addressed to the attacked network through high-capacity networks with "traffic scrubbing" filters. These high-capacity networks have sufficient capacity to withstand the attack, and the traffic scrubbers can filter out the attacking traffic while forwarding desirable traffic to the intended destination. Several companies have developed network based appliances that can act as traffic scrubbers; such devices use a variety of techniques to determine desirable network traffic from undesirable (attack) network traffic.

Many content providers and web hosting providers, however, use a technique called "anycasting" to provide load distribution (and other features) by allowing a group of servers (e.g., web servers, domain name system ("DNS") servers, etc.) all to respond to requests on a single IP address. For high-volume services, such as DNS services, web services, etc., such anycasting techniques can allow a provider to respond to many more requests than a single server could handle, while still benefiting from the ease-of-use of a single IP address to handle such requests. While data scrubbers can be anycasted, both anycasted and non-anycasted (unicast) scrubbers can cause issues with returning (on-ramping) the clean traffic back to the anycast service (e.g., DNS servers, web servers, etc.). A single scrubber will return all the clean traffic it encounters back to the "closest" system offering the service. However, most anycast services are designed to manage a small percentage of the overall traffic for that service. For example, in an anycasted DNS service with 20 servers, each server can handle $\frac{1}{20}$th, or, in other examples, $\frac{1}{10}$th (more likely), of the total overall service requests. Hence, if the data scrubber infrastructure comprises four scrubbing centers, each of the four scrubbing centers would send $\frac{1}{4}$th of the traffic to the closest anycasted server, which can only handle $\frac{1}{10}$th of the service requests, causing server performance to degrade or fail. Further, because the scrubbers often are not as geographically dispersed as the DNS servers, the scrubbers get traffic aggregation problems. Traffic is aggregated in a much higher concentration at downstream servers nearest the scrubbers, presenting problems on balancing the load on the servers.

There is a need for more robust solutions to provide the benefits of data scrubbing within an anycasted environment.

BRIEF SUMMARY

Some embodiments provide tools and techniques for redirecting traffic that is originally destined for a series of servers that all respond to the same IP address (anycasted) and route the traffic through a series of data scrubbing devices. In an aspect, some embodiments can provide the benefits of data scrubbing while still allowing a provider to take advantage of the load-balancing aspects of anycasting.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, a method in accordance with one set of embodiments might comprise receiving network traffic at a plurality of data scrubbing appliances, filtering the network traffic with the plurality of data scrubbing appliances to block undesirable network traffic, and/or transmitting the filtered network traffic to a plurality of anycasted servers.

A method of scrubbing network traffic in accordance with another set of embodiments might comprise assigning a first anycast Internet Protocol ("IP") address to each of a plurality of servers. In a particular aspect of certain embodiments, the method can further comprise assigning a second anycast IP address to each of a plurality of data scrubbing appliances. The method might further comprise establishing, in a routing table at one or more network elements, a first route directing, to the second anycast IP address, network traffic addressed to the first anycast IP address. In some embodiments, the method can comprise receiving, at one or more of the data scrubbing appliances, network traffic addressed to the first anycast IP address. The one or more data scrubbing appliances might filter the network traffic to block undesirable network traffic. The method, then, can comprise transmitting the filtered network traffic, via one or more network tunnels, to one or more of the plurality of servers.

A system for data scrubbing network traffic, in accordance with another set of embodiments, might comprise a plurality of servers, each of which could comprise one or more processors, and/or which might have assigned thereto a first anycast IP address. The system might further comprise a plurality of data scrubbing appliances, each comprising one or more processors. In some embodiments, the plurality of data scrubbing appliances has assigned thereto a second anycast IP address. In some aspects, the system might comprise one or more network elements having stored thereon a routing table. The routing table might include a first route directing, to the second anycast IP address, network traffic addressed to the first anycast IP address. In another aspect, the plurality of data scrubbing appliances might be configured to receive network traffic addressed to the first anycast IP address, filter the network traffic to block undesirable network traffic, and/or transmit the filtered network traffic, via one or more network tunnels, to one or more of the plurality of servers.

In some cases, the system might further comprise a first router in communication with one or more of the plurality of data scrubbing appliances and/or a second router in communication with one or more of the servers and further in communication, via a network tunnel, with the first router. In such an embodiment, one or more of the plurality of data scrubbing appliances might be configured to transmit at least a portion of the filtered network traffic by injecting at least a portion of the filtered network traffic to the first router. More generally, another embodiment might comprise a first plurality of routers, comprising the first router, collectively in communication with the plurality of data scrubbing devices, and/or a second plurality of routers, comprising the second router; each of the second plurality of routers might be in communication with one of the first plurality of routers via a network tunnel. Further, the second plurality of routers collectively might be in communication with the plurality of servers. In such an embodiment, transmitting the filtered network traffic might comprise injecting the filtered network traffic from the plurality of data scrubbers to at least some of the first plurality of routers.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1A:
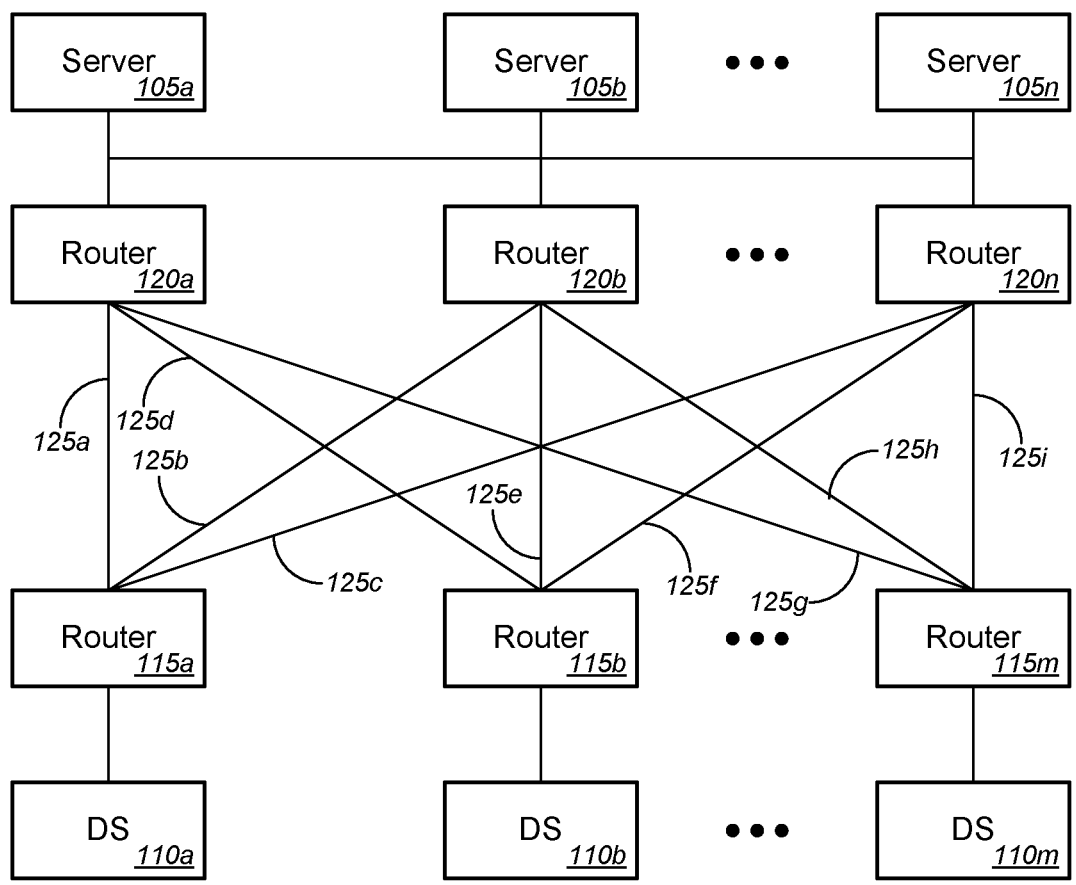
FIGS. 1A and 1B are block diagrams illustrating systems for data scrubbing network traffic, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In one aspect, certain embodiments provide an architecture, systems, and/or methods for redirecting network traffic (e.g., requests from hosts on the Internet to servers at an Internet service provider ("ISP"), servers at a content provider, etc.) that is originally destined for a series of servers that all respond to the same IP address (using a technique known in the art as "anycasting"). This architecture can route the traffic through a series of data scrubbing devices (also referred to as "data scrubbing appliances") via an anycast IP address. Once the data scrubbers have blocked undesirable traffic (such as traffic that is part of a DDoS attack or otherwise is potentially harmful to the servers or other network elements) and have allowed desirable traffic to pass, the desirable traffic must be sent to the original servers.

In different aspects, the architecture provided by one or more of the various embodiments can accomplish this task in the following way:

1) A route to the original anycasted destination servers (e.g., domain name service ("DNS") servers, web servers, and/or any other type of server that can be anycasted) is put into the ISP routing table; in some embodiments, this route will override the original anycasted route to the destination servers and cause the network traffic to be sent to the data scrubbers. This task can be accomplished in a number of ways; for example, the route to the data scrubbers might be a more specific route, which takes precedence over the more generic route to the destination servers; alternatively, the route to the data scrubbers might be assigned a better preference value (i.e., higher priority) in the route announcement. Based on the disclosure herein, the skilled reader will appreciate that there are a number of techniques to cause the route to the data scrubbers to override the route to the destination servers.

2) Data exiting the data scrubbers will be placed in a series of traffic tunnels (of which multiprotocol label switching ("MPLS") tunnels and generic routing encapsulation ("GRE") tunnels are but two examples; the skilled reader will understand from this disclosure that traffic tunnels can be any type of network tunnel than can provide the functionality described herein, including without limitation any type of IP packet encapsulation tunnel). This task can be accomplished, for example, by injecting the traffic to an adjacent router with predefined network traffic tunnels. Each tunnel might terminate on a router close to the original destination server. For instance, traffic can be load balanced to a set of unicast IP addresses that map 1:1 to a set of servers/services that normally would be anycasted.

3) Finally, the traffic can exit the network tunnel and could be statically routed, or if directly connected, can override the original redirection route announcement, from the tunnel to the IP address of the original destination server.

We now turn to the embodiments as illustrated by the drawings. FIGS. 1-4 illustrate some of the features of various methods, systems, and/or apparatus for traffic filtering and/or data scrubbing network traffic. The methods, systems, and apparatus illustrated by FIGS. 1-4 refer to examples of different embodiments that include various components and steps, which can be considered alternatives or which can be used in conjunction with one another in the various embodiments. The description of the illustrated methods, systems, and apparatuses shown in FIGS. 1-4 is provided for purposes of illustration and should not be considered to limit the scope of the different embodiments.

FIG. 1A illustrates an exemplary system 100 that can be used, in accordance with one set of embodiments, for traffic filtering and/or data scrubbing in an aspect of some embodiments. The system 100 comprises a plurality of servers 105. In an aspect, each of the servers is assigned the same IP address using anycasting. For purposes of this document, anycasting can be considered any technique by which a group of devices is addressed with a single IP address, such that communications to that IP address are distributed among the devices (using any appropriate distribution scheme). More generally, anycasting can be considered a "one-to-one-of-many" addressing scheme (as opposed to multicasting, which is a "one-to-many" addressing scheme or unicasting "which is a one-to-one addressing scheme), which routes datagrams to a single member of a group of potential receivers (in this case, the servers 105) that are all identified by the same destination address. The servers 105 can be any set of servers that can each respond to requests received on the anycast IP address. Examples can include, without limitation, DNS servers, network time protocol servers, and/or any other type of server that can be anycast.

The system 100 also comprises a plurality of data scrubbing appliances 110 (also referred to herein as "data scrubbers" and "data scrubbing devices"). In some embodiments, the data scrubbing appliances 110 are anycast to a single IP address (which is a different address than the address assigned to the servers 105), but in other embodiments, they are not (the service provided by the servers 105 is anycasted, but this does not require the scrubbers 110 to be anycasted). The data scrubbing appliances 110 can be any devices that function to filter undesirable traffic (such as traffic associated with a DDoS attack, to name one example) from desirable network traffic addressed to the servers 105 or to otherwise manage the traffic. A number of such appliances are available, including without limitation the traffic management solutions available from Arbor Networks™ (such as the Arbor™ Pravail™ and Peakflow™ traffic management platforms, to name two examples) and other vendors. The term "data scrubbing," as used herein, describes any process undertaken by such a device, and in particular cases, processes used to filter traffic to block undesirable (e.g., DDoS) traffic using such a device.

In accordance with some embodiments, network traffic received at each of the data scrubbing appliances or data scrubbers ("DS") 110 needs to be filtered to block (or remove) undesirable traffic addressed to the servers 105, and the filtered (desirable) traffic needs to be forwarded to one of the servers 105. To accomplish this task, the system 100 features a plurality of routers 115 (referred to herein as "DS routers" merely to distinguish their position in the network), with one DS router (e.g., 115a) in communication with each of the data scrubbers (e.g., 110a). Each DS router 115 is also in communication with a plurality of routers 120 (referred to herein as "server routers," again, merely to distinguish their position in the network), each of which is in communication with one (or more) of the servers 105. Each pair of communicating routers (e.g., DS router 115 and server router 120) is configured to establish a network tunnel 125 (and in the particular case of the routers 115a and 120a, the tunnel 125a, and in the case of DS router 115a and server router 120b, tunnel 125b, and so on) to transport traffic between them. These tunnels 125, which can be virtual private network ("VPN") tunnels, multiprotocol label switching ("MPLS") tunnels, Internet protocol security ("IPSec") tunnels, generic routing encapsulation ("GRE") tunnels, or any other type of tunneling technology that can function to encapsulate traffic and allow custom routing between a DS router 115 and corresponding server router 120. Although three of each of servers 105, data scrubbers 110, DS routers 115 and server routers 120 are illustrated, any number of each device can be implemented in different embodiments. Further, while FIG. 1A shows a one-to-one correlation of servers 105 to data scrubbers 110, this is not required (i.e., sub-label "m" in reference numerals 110m and 115m need not (but can, in some embodiments) equal sub-label "n" in reference numerals 105n and 120n).

Each of the servers 105 might be assigned the same anycast IP address, and they might each advertise this address to one or more of the routers 120. In an aspect, a certain server router (e.g., 120a) might be in closer logical proximity—that is, in terms of route hops—to a certain server (e.g., 105a) than to other servers 105, such that that server 105a will respond on the anycast IP address to that server router 120a, and that server router 120a will route to that server 105a packets addressed to the anycast IP address of the servers 105. Similarly, server router 120b might be in closer logical proximity to server 105b than to other servers, such that server 105b will respond on that anycast IP address to server router 120b and server router 120b will route to that server 105b packets addressed to the anycast IP address of the servers 105, and so forth. Of course, due to the nature of anycasting, if server 105a were unavailable for some reason, server router 120a could route to the next logically closest server 105 (perhaps server 105b, depending on the topology) packets addressed to the anycast IP address of the servers 105.

Alternatively and/or additionally, each of the server routers 120 might have static routes configured to the unicast addresses of one or more (or all) of the servers 105, and those static routes can be used to route packets to individual servers 105. Merely by way of example, server router 120a might have a static route configured to a unicast address of server 105b, etc.

Figure 1B:
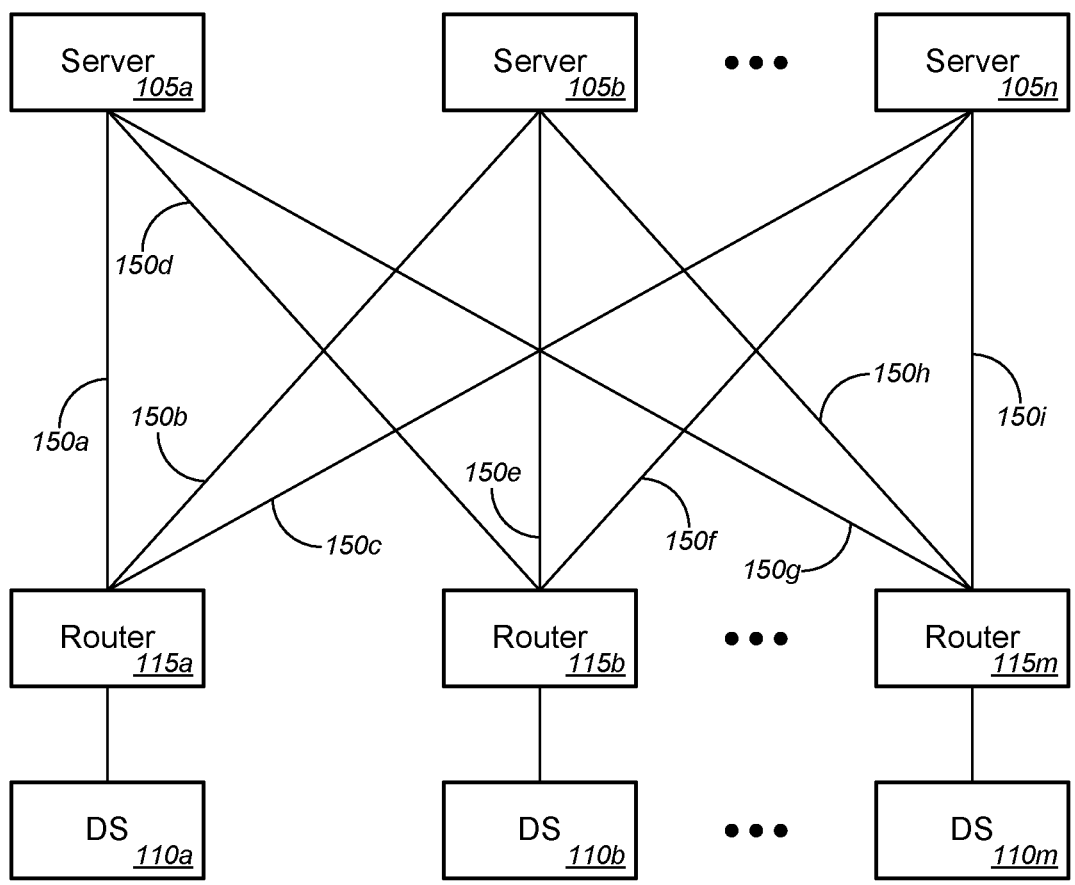

In another embodiment, as illustrated by FIG. 1B, the DS routers 115 might have static routes 150 configured to unicast IP addresses assigned to each server 105. In this case, no tunnels 125 might be required. In either case, however, a DS router (e.g., 115a) receiving traffic from an data scrubber (e.g., 110a) can implement load balancing among the servers 105 by selecting different tunnels (e.g., 125a, 125b, 125c) or different static routes (e.g., 150a, 150b, 150c) in any desired fashion (e.g., round robin, etc.) when routing traffic to the servers 105. In some cases, both the static routes 150 and the tunnels 125 can be implemented in the same embodiment, so that a DS router (e.g., 115a) might have a series of static routes (e.g., 150a, 150b, 150c) configured and a series of tunnels (e.g., 125a, 125b, 125c) established for routing filtered traffic to the servers 105.

Figure 2:
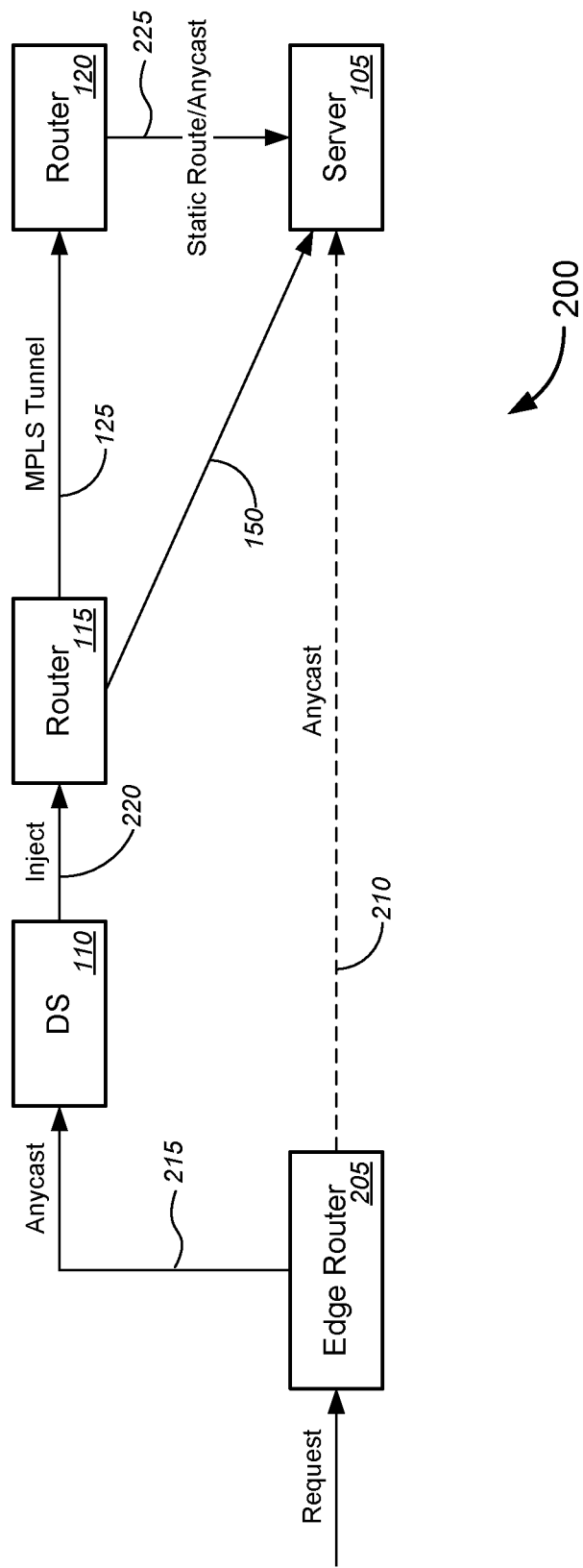
FIG. 2 illustrates traffic flow through a data scrubber, in accordance with various embodiments.

FIG. 2 illustrates one technique 200 by which traffic can be filtered and delivered by the system 100 using the tunnels 125 (and/or static routes 150), in accordance with a set of embodiments. In conventional operation (without traffic filtering), traffic received at an edge router 205 would be routed directly to an anycast server 105 using route 210. Using the system 100, however traffic received at the edge router 205 is routed to the data scrubber 110 based on the routing table at the edge router 205, which prioritizes the route 215 through the data scrubbers 110 as the correct route to reach the anycast IP address for the servers 105. Upon arriving at one of the data scrubbers 110, the traffic is filtered, and the filtered traffic is injected over path 220 to the DS router 115 (or otherwise transmitted to the DS router 115), which then selects a server (e.g., using a load balancing technique) and transmits the traffic through the MPLS tunnel 125 (or other tunnel), which encapsulates IP addresses of the traffic and prevents normal routing of the filtered traffic (which might cause the traffic to be routed back to the data scrubbers 110, for example, since the route through the scrubbers is assigned a higher priority than a direct route to the servers 105). After traversing the tunnel 125, the traffic arrives at the server router 120, which might be in close proximity to a destination server 105 (such that the server anycast address would route to that server 105) and/or is configured with a static route 225 to one (or more) of the servers 105. Based on this static route 225, the traffic is routed to one of the destination servers 105. Alternatively or additionally, the DS router 115 might select a server 105 (again, perhaps using a load balancing algorithm) and might route the traffic to the server 105 over the static route 150.

These techniques provide the ability to anycast both a group of data scrubbers 110 and a group of destination servers 105 without causing routing problems for the traffic between a data scrubber 110 and a destination server 105. For example, by encapsulating the traffic in a tunnel 125, the normal routing tables are avoided, preventing, for instance, rerouting of the traffic back through the data scrubbers 110 and creating a circular route. Instead, the traffic can be filtered at the data scrubbers 110, load balanced across different DS routers 115, and routed directly to the servers 105 through the tunnels 125, without disturbing routes in the rest of the network or creating circular routing paths. Similarly, through use of static routes 150, filtered traffic from the anycast data scrubbers 110 can be load balanced towards the unicast IP address of the anycasted servers 105, without creating routing concerns for other traffic.

Figure 3:
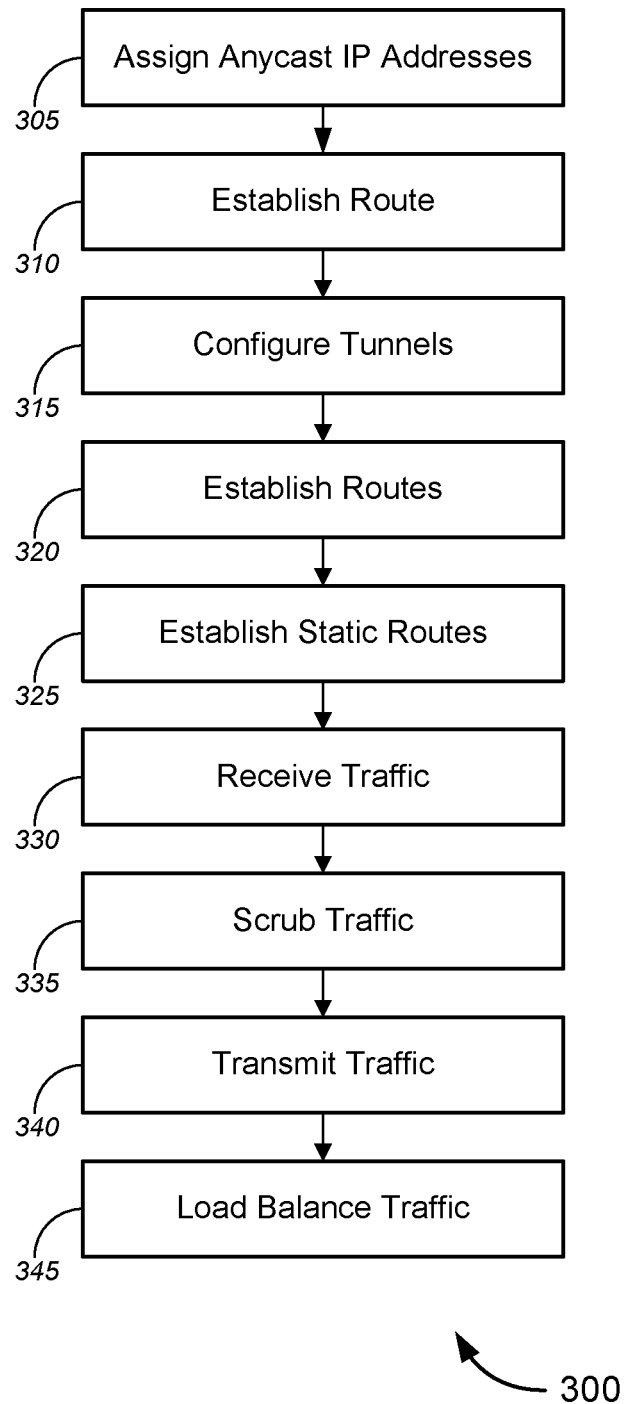
FIG. 3 is a process flow diagram illustrating a method of data scrubbing network traffic, in accordance with various embodiments.

FIG. 3 illustrates a method 300 that can be used to scrub network traffic in accordance with various embodiments. While the techniques and procedures of the method 300 are depicted and/or described in a certain order for purposes of illustration, it should be appreciated that certain procedures may be reordered and/or omitted within the scope of various embodiments. Moreover, while the method illustrated by FIG. 3 can be implemented by (and, in some cases, are described below with respect to) the system 100 of FIG. 1 (or components thereof), the method may also be implemented using any suitable hardware implementation. Similarly, while the system 100 of FIG. 1 (and/or components thereof) can operate according to the method illustrated by FIG. 3 (e.g., by executing instructions embodied on a computer readable medium), the system 100 can also operate according to other modes of operation and/or perform other suitable procedures.

The method 300 might comprise assigning a first anycast IP address to each of a plurality of servers and/or assigning a second anycast IP address to each of a plurality of data scrubbing appliances or data scrubbers ("DS") (block 305). Any suitable technique can be used to anycast an address. Merely by way of example, in some embodiments, each device (e.g., server or DS, respectively) in the same group can be configured with the anycast IP address and border gateway protocol ("BGP") can be used to advertise the anycast IP address on different subnets or different network segments. In various embodiments, IPv4 anycasting and/or IPv6 anycasting can be supported.

The method 300 might further comprise establishing, in a routing table at one or more network elements, a first route directing, to the data scrubbing appliances, network traffic addressed to the destination server (first) anycast IP address (block 310). In one embodiment, this is accomplished using a technique resembling traffic diversion or "off-ramping." Network elements can include any appropriate devices, including, in particular, edge routers in an ISP network or content delivery network. In a particular aspect, this process can include configuring the one or more network elements so that the first route overrides a second route that routes traffic directly to the servers. As noted above, a number of techniques can be used to do this, including assigning a lower preference value to the first route than the second route, configuring the second route as a more specific route, etc.

The method 300 might also include, at block 315, configuring network tunnels between pairs of routers, each pair including a DS router in communication with one or more of the plurality of data scrubbing appliances and a server router in communication with at least one of the plurality of servers. As noted above, such tunnels can include MPLS tunnels and/or any other suitable tunneling technology that allows IP address encapsulation. At block 320, the method 300 can comprise establishing a route between each of the server routers and one or more of the destination servers assigned the first anycast IP address. Such routes can be direct routes to a particular server (e.g., on a unicast IP address assigned to the server), routes to the anycast IP address, or any other routing technique that provides a route to a particular server. Thus, for example, each server router might have a static route to a single server (using the unicast address of that server); alternatively and/or additionally, each server router might route to the anycast IP address assigned to the group of servers, such that the traffic is routed to the logically closest server. Alternatively and/or additionally, the method 300 can include establishing a static route from each of the DS routers to each of the servers (block 325).

In some cases, the method can comprise receiving, at one or more of the data scrubbing appliances, network traffic addressed to the first anycast IP address (block 330). The one or more data scrubbing appliances might filter the network traffic to block undesirable network traffic (block 335). Various techniques can be used to filter the network traffic, including without limitation black-listing malicious hosts, filtering (removing) malformed packets, filtering based on IP location, filtering protocol anomalies filtering, rate limiting (to gracefully manage traffic spikes even if not malicious). Such filtering operations can be automated and/or operator-initiated and can be combined as desired (e.g., to address blended attacks).

The method 300, then, can comprise transmitting the filtered network traffic, generally called "traffic reinjection" or "on-ramping," to one or more of the plurality of servers (block 340). As noted above, this transmission can traverse the tunnels and thus can include injecting the filtered network traffic from the one or more data scrubbers to at least some of the DS routers, transmitting the traffic from the DS routers through the tunnels to the server routers, and transmitting the traffic from the server routers to respective destination servers (either by static routing, default routing to a proximate server, etc.). Alternatively, such a transmission might employ static routes from the DS routers to respective unicast addresses assigned to each of the servers, such that traffic from a particular data scrubber could be injected into a corresponding DS router and then statically routed to one or more of the servers. A number of techniques can be used for such transmission. For example, some embodiments can send traffic from the scrubbers statically to the unicast IP addresses of the servers in a static or load balanced method. Another embodiment might send traffic from the scrubbers through tunnels that originate from the scrubbers and terminate on the unicast addresses of the servers. In yet other cases, an embodiment might send traffic over tunnels that originate on routers downstream from the scrubbers and terminate on the servers. In some cases, transmission might include send traffic over tunnels that originate at routers downstream of the scrubbers and terminate on routers upstream of the servers.

In some cases, the method 300 can include load balancing traffic among the servers (block 345). Many such load balancing techniques are known (the round robin algorithm being a good example), and some such techniques can be implemented on the routers themselves. For example, a DS router could use a round robin (or other load balancing) algorithm to select tunnels and/or unicast IP addresses on which to transmit injected, filtered traffic, in order to provide load balancing on the servers while still providing for anycast data scrubbers and anycast servers. Any of a number of different techniques can be employed as part of the router-based load balancing operation, including without limitation load balancing to an interface, a set of IP addresses. Load balancing can be performed, e.g., at layers 2 and or 3. Based on this disclosure, the skilled reader can appreciate that any number of techniques can be used to load balance the traffic in different embodiments.

Variations are possible in accordance with different embodiments. In a particular set of embodiments, for example a different anycast address (which is not the primary anycast address assigned to the servers or the (optional) anycast address assigned to the scrubbers, can be assigned to a subset of the plurality of servers. Such a different (e.g., third) anycast address could be used on high-capacity servers that are able to handle larger loads. For example, each of the plurality of servers can be assigned the first anycast address. Those that are larger (higher capacity) are also assigned have an additional anycast address. The reinjection or on ramped traffic (clean traffic back to the service/servers) could be sent to the other anycast address which wouldn't include any smaller (lower capacity) servers. This could be done to "load balance" the reinjected traffic towards just the larger servers. In an aspect, this technique can provide the ability to choose to use the closest large server for the service rather then the closest small server so each scrubber (or some subset of scrubbers) would automatically choose from a set of large servers that had the additional anycast address on them.

Figure 4:
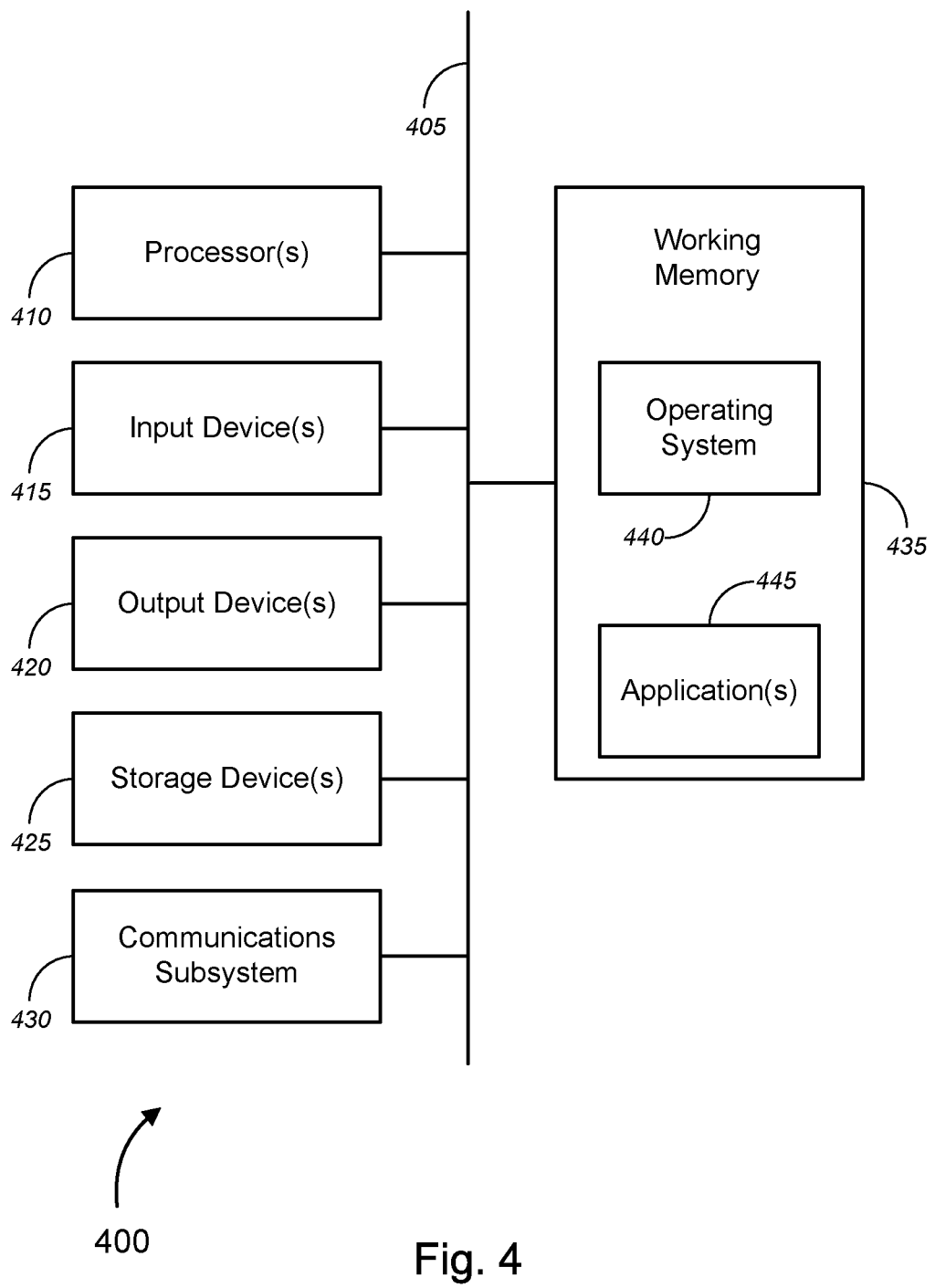
FIG. 4 is a generalized schematic diagram illustrating a computer system, in accordance with various embodiments.

FIG. 4 provides a schematic illustration of one embodiment of a computer system 400 that can perform the methods provided by various other embodiments, as described herein, and/or can function as a server, data scrubbing appliance, router, or other network element. It should be noted that FIG. 4 is meant only to provide a generalized illustration of various components, of which one or more (or none) of each may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including without limitation one or more general-purpose processors and/or one or more special-purpose processors (such as digital signal processing chips, graphics acceleration processors, and/or the like); one or more input devices 415, which can include without limitation a mouse, a keyboard, and/or the like; and one or more output devices 420, which can include without limitation a display device, a printer, and/or the like.

The computer system 400 may further include, or be in communication with, one or more storage devices 425. The one or more storage devices 425 can comprise, without limitation, local and/or network accessible storage, or can include, without limitation, a disk drive, a drive array, an optical storage device, a solid-state storage device. The solid-state storage device can include, but is not limited to, one or more of a random access memory ("RAM") or a read-only memory ("ROM"), which can be programmable, flash-updateable, or the like. Such storage devices may be configured to implement any appropriate data stores, including without limitation various file systems, database structures, or the like.

The computer system 400 might also include a communications subsystem 430, which can include without limitation a modem, a network card (wireless or wired), an infra-red communication device, a wireless communication device and/or chipset, and/or the like. The wireless communication device might include, but is not limited to, a Bluetooth™ device, an 802.11 device, a WiFi device, a WiMax device, a WWAN device, cellular communication facilities, or the like.

The communications subsystem 430 may permit data to be exchanged with a network (such as the network described below, to name one example), with other computer systems, and/or with any other devices described herein, or with any combination of network, systems, and devices. According to some embodiments, the network might include a local area network ("LAN"), including without limitation a fiber network, an Ethernet network, a Token-Ring™ network, and the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol, or any other wireless protocol; or any combination of these or other networks. In many embodiments, the computer system 400 will further comprise a working memory 435, which can include a RAM or ROM device, as described above.

The computer system 400 also may comprise software elements, shown as being currently located within the working memory 435, including an operating system 440, device drivers, executable libraries, and/or other code. The software elements may include one or more application programs 445, which may comprise computer programs provided by various embodiments, and/or may be designed to implement methods and/or configure systems provided by other embodiments, as described herein. Merely by way of example, one or more procedures described with respect to the methods discussed above might be implemented as code and/or instructions executable by a computer (and/or a processor within a computer). In an aspect, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system—that is, a removable medium, such as a compact disc, or the like. In some embodiments, the storage medium might be provided in an installation package, such that the storage medium can be used to program, configure, and/or adapt a general purpose computer with the instructions/code stored thereon. These instructions might take the form of executable code, which is executable by the computer system 400 and/or might take the form of source and/or installable code. The source or installable code, upon compilation, installation, or both compilation and installation, on the computer system 400 might take the form of executable code. Compilation or installation might be performed using any of a variety of generally available compilers, installation programs, compression/decompression utilities, or the like.

It will be apparent to those skilled in the art that substantial variations may be made in accordance with specific requirements. For example, customized hardware—such as programmable logic controllers, field-programmable gate arrays, application-specific integrated circuits, and/or the like—might also be used. In some cases, particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions. The one or more instructions might be incorporated into the operating system 440 and/or other code that may be contained in working memory 435, such as an application program 445. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operation in a specific fashion. In an embodiment implemented using the computer system 400, various computer readable media might be involved in providing instructions/code to processor(s) 410 for execution, might be used to store and/or carry such instructions/code such as signals, or both. In many implementations, a computer readable medium is a non-transitory, physical, and/or tangible storage medium. Such a medium may take many forms, including, but not limited to, non-volatile media, volatile media, and transmission media. Non-volatile media includes, for example, optical disks, magnetic disks, or both, such as the storage device(s) 425. Volatile media includes, without limitation, dynamic memory, such as the working memory 435. Transmission media includes, without limitation, coaxial cables, copper wire and fiber optics, including the wires that comprise the bus 405, as well as the various components of the communication subsystem 430, and/or the media by which the communications subsystem 430 provides communication with other devices. Hence, transmission media can also take the form of waves, including without limitation radio, acoustic, and/or light waves, such as those generated during radio-wave and infra-red data communications.

Common forms of physical or tangible computer readable media include, for example, a floppy disk, a flexible disk, a hard disk, magnetic tape, or any other magnetic medium; a CD-ROM, DVD-ROM, or any other optical medium; punch cards, paper tape, or any other physical medium; a RAM, a PROM, an EPROM, a FLASH-EPROM, or any other memory chip or cartridge; a carrier wave; or any other medium from which a computer can read instructions or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    receiving, at an edge router, network traffic addressed to a first anycast address assigned to a plurality of anycasted servers, the plurality of anycasted servers assigned to the first anycast address comprising one or more anycasted servers and a subset of servers of the plurality of servers assigned to a third anycast address;
    forwarding, from the edge router, the network traffic addressed to the first anycast address to a second anycast address assigned to each of one or more data scrubbing appliances in at least one data scrubbing appliance network;
    receiving, with at least one data scrubbing appliance, the network traffic from the edge router;
    filtering, with the at least one data scrubbing appliance, undesirable traffic from the network traffic;
    transmitting the filtered network traffic from the at least one data scrubbing appliance to at least one of the plurality of anycasted servers assigned to the first anycast address or the subset of servers of the plurality of servers assigned to the third anycast address; and
    load balancing the filtered network traffic to the plurality of anycasted servers, wherein load balancing the filtered network traffic to the one or more servers comprises prioritizing routing at least some of the filtered network traffic to the subset of the plurality of servers assigned to the third anycast address rather than routing at least some of the filtered traffic to a subset of the plurality of servers assigned only to the first anycast address.

2. A method of data scrubbing network traffic, the method comprising:
    assigning a first anycast Internet Protocol ("IP") address to each of a plurality of servers;
    assigning a second anycast IP address to each of one or more data scrubbing appliances in at least one data scrubbing appliance network;
    assigning a third anycast IP address to a subset of the plurality of servers assigned to the first anycast IP address;
    establishing, in a routing table at one or more network elements, a first route directing traffic that is addressed to the first anycast IP address to the at least one data scrubbing appliance network;
    receiving, at one or more data scrubbing appliances of the at least one data scrubbing appliance network, network traffic addressed to the first anycast IP address;
    filtering, with the one or more data scrubbing appliances, the network traffic to block undesirable network traffic;
    transmitting the filtered network traffic to at least one of one or more servers of the plurality of servers assigned to the first anycast address or the subset of servers of the plurality of servers assigned to the third IP anycast address; and
    load balancing the filtered network traffic to the one or more servers, wherein load balancing the filtered network traffic to the one or more servers comprises prioritizing routing at least some of the filtered network traffic to the subset of the plurality of servers assigned to the third IP anycast address rather than routing at least some of the filtered traffic to a subset of the plurality of servers assigned only to the first anycast address.

3. The method of claim 2, further comprising overriding the first route of the routing table with a second route that routes traffic directly to the servers at the first anycast IP address.

4. The method of claim 3, wherein overriding the first route comprises assigning a lower preference value to the first route than the second route at the routing table.

5. The method of claim 4, wherein overriding the first route comprises configuring the second route as a more specific route than the first route.

6. The method of claim 2, further comprising establishing static routes between each of a plurality of routers in communication with the one or more data scrubber appliances and the plurality of servers, wherein transmitting the filtered network traffic comprises transmitting the filtered traffic on the static routes.

7. The method of claim 2, wherein transmitting the filtered network traffic comprises transmitting the filtered network traffic through one or more network tunnels.

8. The method of claim 7, further comprising:
configuring a first network tunnel between a first router in communication with at least one of the one or more data scrubbing appliances and a second router in communication with at least one of the plurality of servers;
wherein transmitting the filtered network traffic comprises injecting at least a portion of the filtered network traffic from the one or more data scrubber appliances to the first router.

9. The method of claim 8, further comprising:
configuring a plurality of network tunnels, the plurality of network tunnels comprising the first network tunnel, each of the plurality of network tunnels traversing between one of a first plurality of routers collectively in communication with the one or more data scrubbing appliances and one of a second plurality of routers collectively in communication with the plurality of servers, the first plurality of routers comprising the first router and the second plurality of routers comprising the second router;
wherein transmitting the filtered network traffic comprises injecting the filtered network traffic from the one or more data scrubber appliances to at least some of the first plurality of routers.

10. The method of claim 9, further comprising:
routing the traffic from the second plurality of routers to the first anycast IP address assigned to each of the plurality of servers, such that traffic from each of the second plurality of routers will be routed to a server of the plurality of servers logically closest to that router.

11. The method of claim 9, further comprising:
establishing a static route between each of the second plurality of routers and one or more of the plurality of servers to which the first anycast IP address is assigned.

12. The method of claim 11, wherein each static route routes traffic to a unicast IP address assigned to one of the servers.

13. The method of claim 9, wherein the plurality of network tunnels comprises one or more multiprotocol label switching ("MPLS") network tunnels.

14. The method of claim 9, wherein the plurality of network tunnels comprises one or more generic routing encapsulation ("GRE") network tunnels.

15. The method of claim 2, wherein the plurality of servers comprises a plurality of web servers.

16. The method of claim 2, wherein the plurality of servers comprises a plurality of domain name service ("DNS") servers.

17. The system of claim 2, wherein prioritizing routing at least some of the filtered network traffic further comprises prioritizing routing the filtered network traffic to higher capacity servers assigned to the third anycast address rather than routing at least some of the filtered network traffic to lower capacity servers assigned only to the first anycast address.

18. A system for data scrubbing network traffic, the system comprising:
a plurality of servers, each comprising one or more processors, each of the plurality of servers having assigned thereto a first anycast Internet Protocol ("IP") address;
a subset of servers of the plurality of servers assigned to a third anycast IP address;
a plurality of data scrubbing appliances in at least one data scrubbing appliance network, each comprising one or more processors and each having assigned thereto a second anycast IP address;
one or more network elements having stored thereon a routing table, the routing table comprising a first route directing network traffic that is addressed to the first anycast IP address to the second anycast IP address of the one or more of the plurality of data scrubbing appliances in the at least one data scrubbing appliance network;
wherein the plurality of data scrubbing appliances are configured to:
receive network traffic addressed to the first anycast IP address and directed to the second anycast IP address;
filter the network traffic to block undesirable network traffic;
transmit the filtered network traffic, via one or more network tunnels, to at least one of one or more of the plurality of servers assigned to the first anycast address or the subset of servers of the plurality of servers assigned to the third IP anycast address; and
load balance the filtered network traffic to the plurality of servers, wherein load balancing the filtered network traffic to the one or more servers comprises routing at least some of the filtered network traffic to the subset of the plurality of servers assigned to the third IP anycast rather than routing at least some of the filtered traffic to a subset of the plurality of servers assigned only to the first anycast address.

19. The system of claim 18, further comprising:
a first router in communication with one or more data scrubbing appliances of the plurality of data scrubbing appliances; and
a second router in communication with one or more servers of the plurality of servers and further in communication, via a network tunnel, with the first router;
wherein the one or more data scrubbing appliances are configured to transmit at least a portion of the filtered network traffic by injecting the at least a portion of the filtered network traffic to the first router.

20. The system of claim 19, further comprising:
a first plurality of routers, comprising the first router, collectively in communication with the plurality of data scrubbing appliances;
a second plurality of routers, comprising the second router, each of the second plurality of routers in communication with one of the first plurality of routers via a network tunnel, the second plurality of routers collectively being in communication with the plurality of servers;
wherein transmitting the filtered network traffic comprises injecting the filtered network traffic from the plurality of data scrubber appliances to at least some of the first plurality of routers.

* * * * *